UNITED STATES PATENT OFFICE 2,360,102

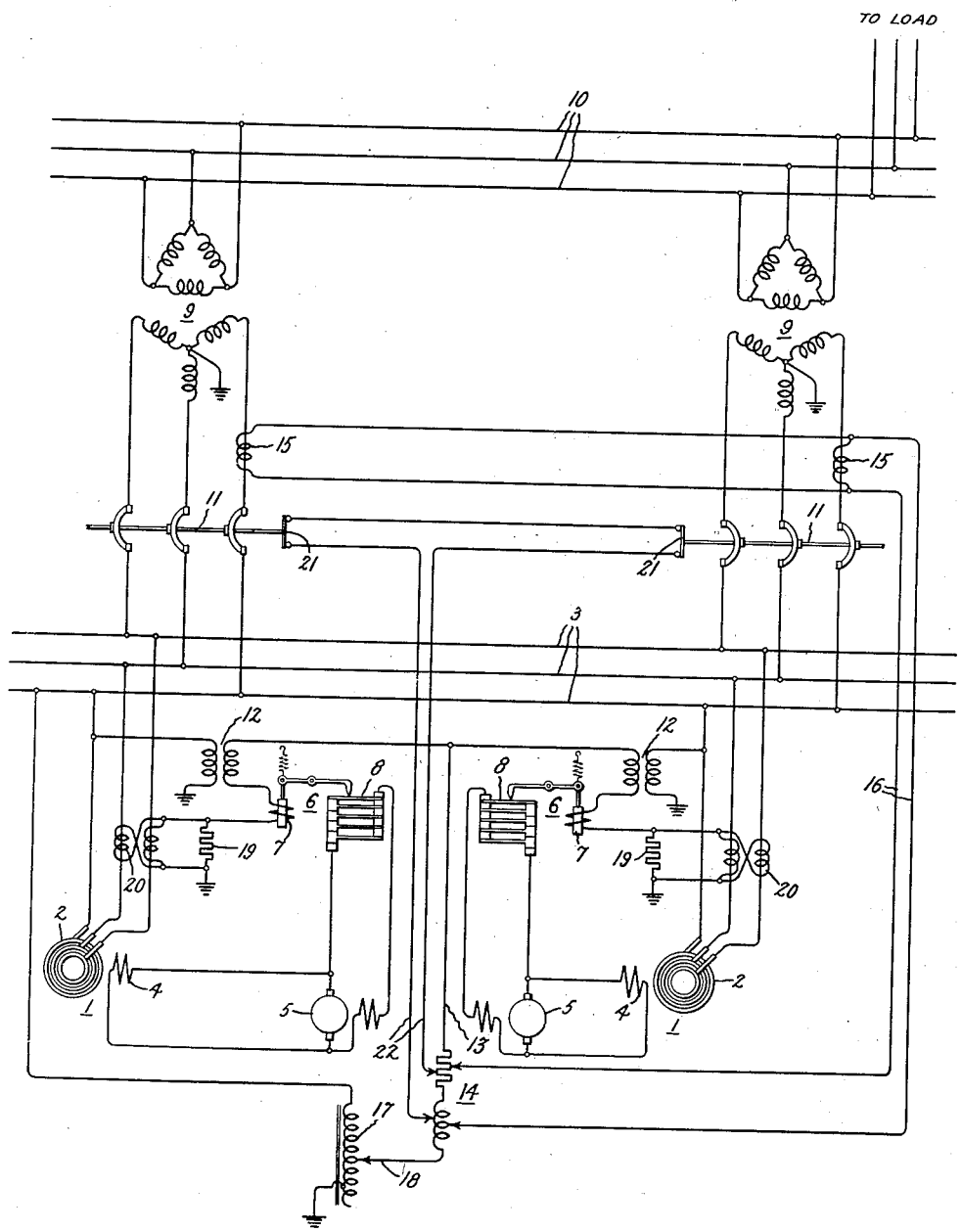

REGULATOR SYSTEM

Philip G. Bowman, St. Paul, Minn., assignor to General Electric Company, a corporation of New York Application December 1, 1942, Serial No. 467,551

10 Claims. (Cl. 171—119)

This invention relates to automatic regulator systems and more particularly to improvements in the parallel operation of such systems.

When a plurality of power units or devices, such for example as dynamo-electric generators, are connected in parallel and each is provided with its own automatic regulator, it is often desirable to be able to control simultaneously both automatically and manually the operation or settings of all of the regulators. In accordance with this invention there is provided a novel and simple system for accomplishing this result in an economical manner.

An object of the invention is to provide a new and improved automatic regulator system.

Another object of the invention is to provide a new and improved common control system for a plurality of parallel automatic regulator systems.

The invention will be better understood from the following description taken in connection with the accompanying drawing and its scope will be pointed out in the appended claims.

Referring now to the single figure of the accompanying drawing, which illustrates diagrammatically a preferred embodiment of the invention, there is shown therein an alternating-current power generation and distribution system comprising, by way of example, a pair of three-phase alternators 1 whose armatures 2 are connected in parallel to a three-phase generator bus 3. Each generator is provided with a direct-current field winding 4 energized by a shunt-connected exciter 5 whose field current is controlled by an automatic regulator 6. This regulator is shown by way of example as a direct-acting rheostatic voltage regulator for the alternator. It has a primary electroresponsive device 7 connected directly to control the resistance of a rheostatic element 8 which may be of any suitable type, such as a carbon pile, but which is preferably of the type described and claimed in Patent No. 2,136,257, granted November 8, 1938, on an application of Louis W. Thompson, and assigned to the assignee of the present application. Each regulator 6 is so organized that when the energization of its primary control device increases in response to an increase in the voltage to which it responds, it increases the resistance of its rheostatic element 8, thereby decreasing the excitation and voltage of the exciter 5 and consequently decreasing the excitation and voltage of the main alternator 1. Conversely, when the energization of the primary control device 7 decreases, the resistance of the rheostatic element 8 decreases, thereby to increase the excitation and voltage of exciter 5 and main machine 1.

The power delivered to the generator bus 3 by the generators 1 has its voltage stepped up by step-up power transformers 9 whose secondary windings are connected to a high-tension bus 10 for reliability and also in order that all the generated power may be transformed with reasonably sized transformers. For controlling the power flow through the transformers they are each provided with a series-connected circuit breaker 11 so that they may be selectively removed from service whenever it is desirable or necessary to do so.

Each primary control device 7 is connected to respond to the corresponding voltage of its associated main generator. As shown, they are connected by means of potential transformers 12 to respond to the phase or line to ground or neutral voltage of the left-hand conductor of the three-phase circuit connecting each armature 2 with the low tension bus 3. These main control circuits including the devices 7 and the secondary windings of the potential transformers 12 have a common return circuit or conductor 13, which return circuit is shown completed through ground.

As the transformers 9 have a certain amount of impedance and as the conductors between the low tension bus 3 and a load which may be connected to the high tension bus 10 also have a certain amount of impedance, there will be a variable voltage drop caused by variations in load current flowing through the above-mentioned impedances which will cause variations in load voltage even if the terminal voltage of the generators or the voltage of the low tension bus 3 are maintained constant. In order to correct for this a line drop compensator 14 is inserted in the common return conductor 13 and through this compensator there is caused to flow a current which is proportional to the total load current of the generators 1. This total current is derived from current transformers 15 connected in corresponding lines of the transformers 9, the two secondary windings of the current transformers being connected in parallel to a circuit 16 which thereby carries the sum of the currents of these two current transformers and this circuit 16 is connected to the line drop compensator 14.

The line drop compensator is shown by way of example as a resistance and reactance type of compensator which inserts in the common circuit 13 resistance and reactance voltages or voltage drops which are proportional to the voltage drops in the power circuits between the points on these circuits at which the regulators normally hold constant voltage and the remote point on the system at which it is desired to maintain constant voltage. These voltage drops subtract from the voltages applied to the primary control devices 7 by the potential transformers and therefore cause the regulators to hold sufficiently higher voltages than they otherwise would so as to equalize or cancel the effect of the voltage drop to the point at which voltage is to be maintained constant.

It will be seen that the current transformers 15 are connected in the same line or phase conductor between which and neutral the potential transformers 12 are connected. Therefore, at unity power factor on the system the current circulated in the line drop compensator will be in phase with the voltage impressed on the primary control devices so as to give correct line drop compensation.

It is sometimes desirable to be able simultaneously to raise or lower the voltage of all of the machines 1 so as to vary the voltage level of the system. I accomplish this result by means of a manually adjustable variable voltage device which is connected in the common conductor 13. This device is shown by way of example as a variable ratio autotransformer 17 having an intermediate point grounded and having one terminal thereof connected to the same line conductor of the low tension bus to which the potential transformers 12 are connected. An adjustable contact 18 thereon is connected to the common conductor 13 so that by moving this adjustable contact 18 above and below the grounded point of the autotransformer winding a voltage of variable magnitude may be added to or subtracted from the voltage of the main control circuits of the regulators, thereby to cause the regulators to raise or lower the voltages of their associated alternators.

A variable voltage autotransformer for adjusting simultaneously the voltages of the generators 1 is preferable to a rheostat because the latter would result in variable burdens on the potential circuits of the regulators.

In order to prevent excessive circulating wattless currents between the parallel-connected alternators in case their voltages are not maintained equal by reason of slight dissimilarities in the characteristics of their voltage regulators, or excitation systems, or both, they are each provided with cross-current compensating means in the form of resistors 19 connected in series with the main control coil 7. These resistors are each connected to a pair of cross-connected current transformers 20 which circulate through them a current proportional to the vector difference between the currents in the two armature conductors to which the potential transformer 12 is not connected. This vector difference current will at unity power factor be in quadrature with the voltage of the potential transformer 12 so that it will have little or no effect on the action of the regulators. Any circulating current in the alternators and the low tension bus 3 caused by any material difference in voltage between the alternators is a very low power factor current which is lagging in the high voltage machine or machines and leading in the low voltage machine or machines. Therefore, the phase of the voltage drop through the resistors 19 will shift in opposite directions when there is a circulating current, it adding to the voltage impressed on the primary control device 7 of the high voltage machine and subtracting from the voltage impressed on the primary control device 7 of the low voltage machine, thus causing the regulator of the high voltage machine to lower the voltage and causing the regulator for the low voltage machine to raise its voltage, thereby to equalize the voltages that reduce the circulating current substantially to zero.

As the removal of one of the power transformers 9 from the circuit by reason of the opening of its circuit breaker 11 would increase the impedance to the flow of load current between the low and high tension buses, the line drop compensator 14 would no longer give correct compensation. In order to correct for this the circuit breakers 11 are provided with normally closed auxiliary contacts 21 which through a circuit 22 normally short circuit portions of the resistance and reactance elements of the line drop compensator 14. Therefore, whenever one of the circuit breakers 11 is opened, its auxiliary contacts 21 open, thereby to remove the short circuit of a portion of the line drop compensator whereby the corrective action of the compensator is maintained correct.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a plurality of power producing units connected in parallel to a common load, separate means associated with each of said units for regulating the same characteristic of the power output thereof, each of said means including a control circuit responsive to a voltage which is proportional to the magnitude of said characteristic of its associated unit, said control circuits having a common return conductor, and means for inserting an adjustable voltage which is substantially independent of variations in the power output of units in said common return conductor whereby the value of said characteristic of all of said devices may simultaneously be adjusted to any desired value.

2. In combination, a plurality of power producing units connected in parallel to a common load, separate means associated with each of said units for regulating the same characteristic of the power output thereof, each of said means including a control circuit responsive to a voltage which is proportional to the magnitude of said characteristic of its associated unit, said control circuits having a common return conductor, means responsive to a function of the combined power output of said units for inserting in said common return conductor a voltage proportional to the difference in value of said characteristic between said load and the terminals of said devices which is caused by the flow of power through the power conducting connection therebetween, and means for inserting an adjustable voltage in said common return conductor whereby the value of said characteristic of all of said devices may simultaneously be adjusted to any desired value.

3. In combination, a plurality of parallel-connected devices each having a similar variable operating quantity to be regulated, separate means associated with each of said devices for regulating its said quantity, each of said means including a control circuit responsive to a voltage which is proportional to said quantity of its associated device, said control circuits having a common return conductor, and means for inserting an adjustable voltage which is substantially independent of normal variations in all operating conditions of said devices in said common return conductor whereby the said quantity of all of said devices may simultaneously be adjusted to any desired value.

4. The combination as set forth in claim 3 in which said adjustable voltage means is a variable ratio transformer.

5. In combination, a plurality of electrical generators connected in parallel circuit relation to a common circuit, separate means associated with each generator for regulating its voltage, each of said means including a separate control circuit responsive to the voltage of its associated generator, said control circuits having a common return conductor, and means for inserting an adjustable voltage which is substantially independent of the load current of said generators in said common return conductor whereby the voltage of all of said machines may simultaneously be adjusted to any desired value.

6. In combination, a plurality of electrical generators connected in parallel circuit relation to a common circuit, separate means associated with each generator for regulating its voltage, each of said means including a separate control circuit responsive to the voltage of its associated generator, said control circuits having a common return conductor, means for inserting an adjustable voltage in said common return conductor whereby the voltage of all of said machines may simultaneously be adjusted to any desired value, and means responsive to the total load current output of said generators for inserting in said return conductor a voltage proportional to the voltage difference between a point on said common circuit and the voltage at the terminals of said generators.

7. In combination, a relatively low tension generator bus, a plurality of alternators connected in parallel thereto, a relatively high tension bus, a plurality of voltage step-up power transformers connected in parallel between said buses, a transmission circuit connected to said high tension bus, a separate automatic rheostatic voltage regulator for each alternator, each of said regulators having a primary control circuit responsive to the voltage of its associated alternator, said control circuits having a common return conductor, a line drop compensator connected in said common return conductor, a separate current transformer connected in series with each of said power transformers, and a circuit across which the secondary windings of said current transformers are connected in parallel arranged to energize said line drop compensator with a current equal to the sum of the currents of the secondary windings of said current transformers.

8. In combination, a relatively low tension generator bus, a plurality of alternators connected in parallel thereto, a relatively high tension bus, a plurality of voltage step-up power transformers connected in parallel between said buses, a transmission circuit connected to said high tension bus, a separate automatic rheostatic voltage regulator for each alternator, each of said regulators having a primary control circuit responsive to the voltage of its associated alternator, said control circuits having a common return conductor, a line drop compensator connected in said common return conductor, a separate current transformer connected in series with each of said power transformers, a circuit across which the secondary windings of said current transformers are connected in parallel arranged to energize said line drop compensator with a current equal to the sum of the currents of the secondary windings of said current transformers, and manually controllable means for inserting an adjustable voltage in said common return conductor so as simultaneously and equally to vary the generator voltages held by said regulators.

9. The combination as set forth in claim 8 in which said manually controllable means is a variable ratio transformer.

10. In combination, a relatively low tension generator bus, a plurality of alternators connected in parallel thereto, a relatively high tension bus, a plurality of voltage step-up power transformers connected in parallel between said buses, a transmission circuit connected to said high tension bus, a separate automatic rheostatic voltage regulator for each alternator, each of said regulators having a primary control circuit responsive to the voltage of its associated alternator, said control circuits having a common return conductor, a line drop compensator connected in said common return conductor, a separate current transformer connected in series with each of said power transformers, a circuit across which the secondary windings of said current transformers are connected in parallel arranged to energize said line drop compensator with a current equal to the sum of the currents of the secondary windings of said current transformers, a separate circuit breaker connected in series with each of said power transformers, auxiliary contacts controlled by said circuit breakers, and means controlled by said auxiliary contacts for changing the setting of said line drop compensator.

PHILIP G. BOWMAN.